United States Patent
Magari et al.

(10) Patent No.: US 8,317,950 B2
(45) Date of Patent: Nov. 27, 2012

(54) METHOD OF MAKING HYDROGEN-ABSORBING ALLOY FOR ALKALINE STORAGE BATTERY, AND ALKALINE STORAGE BATTERY

(75) Inventors: Yoshifumi Magari, Moriguchi (JP); Jun Ishida, Moriguchi (JP); Shigekazu Yasuoka, Moriguchi (JP)

(73) Assignee: SANYO Electric Co., Ltd., Moriguchi (JP)

( * ) Notice: Subject to any disclaimer, the term of this patent is extended or adjusted under 35 U.S.C. 154(b) by 274 days.

(21) Appl. No.: 12/232,129

(22) Filed: Sep. 11, 2008

(65) Prior Publication Data

US 2009/0014100 A1    Jan. 15, 2009

Related U.S. Application Data

(63) Continuation of application No. 11/703,150, filed on Feb. 7, 2007, now abandoned.

(30) Foreign Application Priority Data

| Feb. 9, 2006 | (JP) | 2006-032036 |
| Sep. 1, 2006 | (JP) | 2006-237931 |
| Jan. 16, 2007 | (JP) | 2007-006537 |

(51) Int. Cl.
    *C22F 1/10* (2006.01)

(52) U.S. Cl. .......... 148/555
(58) Field of Classification Search .......... 148/555
    See application file for complete search history.

(56) References Cited

U.S. PATENT DOCUMENTS

| 5,762,728 | A | * | 6/1998 | Kuramasu et al. | 148/549 |
| 5,964,968 | A | * | 10/1999 | Kaneko | 148/555 |
| 6,130,006 | A | * | 10/2000 | Kohno et al. | 429/223 |
| 2003/0096164 | A1 | | 5/2003 | Sakai et al. | |

FOREIGN PATENT DOCUMENTS

| CN | 1406396 A | | 3/2003 |
| JP | 2002-069554 A | | 3/2002 |
| JP | 2004-115870 | * | 4/2004 |
| JP | 2004-115870 A | | 4/2004 |

OTHER PUBLICATIONS

English Abstract and English Machine Translation of Takamaru, et al. (JP 2004-115870) (Apr. 2004).*

Chinese Office Action dated Jul. 3, 2009, issued in corresponding Chinese Application No. 200710005414.3.

* cited by examiner

*Primary Examiner* — Jessee R. Roe

(74) *Attorney, Agent, or Firm* — Westerman, Hattori, Daniels & Adrian, LLP

(57) ABSTRACT

A hydrogen-absorbing alloy for alkaline storage battery which is produced by a rapid cool using a rapid quenching method and whose component is represented by a general formula $Ln_{1-x}Mg_xNi_{a-b-c}Al_bZ_c$ is used for a negative electrode of an alkaline storage battery.

1 Claim, 1 Drawing Sheet

METHOD OF MAKING HYDROGEN-ABSORBING ALLOY FOR ALKALINE STORAGE BATTERY, AND ALKALINE STORAGE BATTERY

RELATED APPLICATIONS

This application is a continuation application of U.S. Ser. No. 11/703,150, filed Feb. 7, 2007, now abandoned, which claims priority of Japanese Patent Application Nos. 2006-032036, 2006-237931 and 2007-006537, respectively, each of which are hereby incorporated by reference in their entirety.

BACKGROUND OF THE INVENTION

1. Field of the Invention

This invention relates to a hydrogen-absorbing alloy for alkaline storage battery, and to an alkaline storage battery employing a positive electrode, a negative electrodes using the hydrogen-absorbing alloy for alkaline storage battery, and an alkaline electrolyte. More particularly, a feature of the invention is an improvement in a hydrogen-absorbing alloy for alkaline storage battery used for a negative electrode in an alkaline storage battery, which utilizes, for the purpose of enhancing hydrogen-absorbing capability of the hydrogen-absorbing alloy and improving a cycle life of the alkaline storage battery.

2. Description of Related Art

Conventionally, nickel-cadmium storage batteries have been commonly used as alkaline storage batteries. In recent years, nickel metal hydride batteries using a hydrogen-absorbing alloy as a material for their negative electrodes have drawn considerable attention from the viewpoints that they have higher capacity than nickel-cadmium storage batteries and, being free of cadmium, they are more environmentally safe.

As the nickel metal hydride batteries have been used in various portable devices, demands for further higher performance in the nickel metal hydride batteries have been increasing.

In the nickel metal hydride batteries, hydrogen-absorbing alloys such as a rare earth-nickel hydrogen-absorbing alloy having a $CaCu_5$ crystal structure as its main phase and a Laves phase hydrogen-absorbing alloy containing Ti, Zr, V and Ni have been generally used for their negative electrodes.

However, these hydrogen-absorbing alloys generally do not necessarily have sufficient hydrogen-absorbing capability, and it has been difficult to increase the capacity of the alkaline storage batteries further.

In recent years, in order to improve the hydrogen-absorbing capability of the rare earth-nickel hydrogen-absorbing alloy, it has been proposed to use a hydrogen-absorbing alloy having a crystal structure other than $CaCu_5$ type, by adding magnesium to the rare earth-nickel hydrogen-absorbing alloy (see Japanese Published Unexamined Patent Application No. 2002-69554).

Nevertheless, problems in producing the above-described hydrogen-absorbing alloy containing rare earth elements, nickel and magnesium by a metal mold casting process which is a conventional commonly used method, have been that it is difficult to obtain a hydrogen-absorbing alloy having an uniform structure, due to differences in melting point and specific gravity between magnesium and the other elements, and characteristics of the hydrogen-absorbing alloy such as corrosion resistance and a cycle life of the alkaline storage battery are degraded.

In this connection, there has been proposed a rapid quenching method to produce a hydrogen-absorbing alloy containing rare earth elements, nickel and magnesium with an uniform structure (see Japanese Published Unexamined Patent Application No. 2004-115870).

However, in producing the hydrogen-absorbing alloy containing the rare earth elements, nickel and magnesium by the rapid quenching method, there have still been the following problems. If a composition of the hydrogen-absorbing alloy is not suitable, the cycle life of the alkaline storage battery is degraded and hydrogen-absorbing capability of the hydrogen-absorbing alloy is lowered.

SUMMARY OF THE INVENTION

The present invention is directed to a solution to the above problems associated with an alkaline storage battery using a hydrogen-absorbing alloy for alkaline storage battery containing rare earth elements, nickel and magnesium, as its negative electrode.

A first object of the invention is to obtain a hydrogen-absorbing alloy for alkaline storage battery containing rare earth elements, nickel and magnesium with a uniform structure and a suitable composition, and to improve hydrogen-absorbing capability thereof.

An another object of the invention is to improve a cycle life of the alkaline storage battery using the hydrogen-absorbing alloy for alkaline storage battery as its negative electrode, and to obtain an alkaline storage battery with a high capacity.

The hydrogen-absorbing alloy for alkaline storage battery according to the present invention is produced by a rapid cool using a rapid quenching method and has a composition represented by a general formula $Ln_{1-x}Mg_xNi_{a-b-c}Al_bZ_c$, where Ln is at least an element selected from rare earth elements including Y, Zr, and Z is at least one element selected from the group consisting of V, Nb, Ta, Cr, Mo, Mn, Fe, Co, Ga, Zn, Sn, In, Cu, Si, P, and B, $0.05 \leq x < 0.25$, $2.8 \leq a \leq 3.9$, $0 < b \leq 0.30$, and $0 \leq c \leq 0.25$.

Herein, in order to produce the hydrogen-absorbing alloy for alkaline storage battery by the rapid cool, a publicly known rapid quenching method may be used. A rapid quenching method is a method for forming an alloy ingot by super rapidly cooling an alloy melt. One of examples is a roll method, such as, a single roll method and a twin roll method, which is the method to eject the alloy melt on a roll rotating fast. While a cooling rate is about 10 K/s in a conventional metal mold casting process, the cooling rate is not less than $10^2$ K/s to $10^3$ K/s, generally, about 1 K/s to $10^6$ K/s, in a rapid quenching method.

The hydrogen-absorbing alloy for alkaline storage battery produced by the rapid cool using the rapid quenching method whose composition is represented by the above general formula has an uniform structure of $Ce_2Ni_7$ crystal structure or a similar structure with a high crystallinity.

Even in the hydrogen-absorbing alloy for alkaline storage battery produced as above, if the ratio of Mg is too large, an uniform alloy structure is not attained and corrosion resistance is deteriorated. On the other hand, if the ratio of Mg is too small, maintenance of the $Ce_2Ni_7$ crystal structure or the similar structure becomes difficult because of drastic change of its crystal structure and hydrogen-absorbing capability is drastically lowered. For these reasons, it is necessary that x indicating the ratio of Mg in the general formula be $0.05 \leq x < 0.25$, and preferably be $0.05 \leq x \leq 0.20$.

The hydrogen-absorbing alloy for alkaline storage battery has the following tendency that if the ratio of Mg is large, the capacity is increased and if the ratio of Al is large, the corrosion resistance is improved. As a result of observation of the alloy structure by EPMA, Al concentration is low in parts where Mg concentration is high, and Mg concentration is low in parts where Al concentration is high, which means a concentration dispersion of Mg is the opposite of that of Al. It shows that Mg and Al are not easily mixed each other due to their dispositions. Therefore, if a total amount of Mg and Al in the alloy structure is large, segregation occurs easily. For these reasons, the use of rapid quenching method having a superior effect for uniform of alloy structure has a greater effect in the hydrogen-absorbing alloy for alkaline storage battery wherein the total amount of Mg and Al in the alloy structure is large. Particularly, the effect is greater in the hydrogen-absorbing alloy for alkaline storage battery wherein the total amount of Mg and Al, (x+b) in the above general formula is not less than 0.30, making it possible to attain a hydrogen-absorbing alloy for alkaline storage battery having a high capacity and a superior corrosion resistance.

In the hydrogen-absorbing alloy for alkaline storage battery, a, b and c satisfy $2.8 \leq a \leq 3.9$, $0 < b \leq 0.30$, and $0 \leq c \leq 0.25$ in the above general formula. It is because if a, b and c are out of the above ranges, the crystal structure of the hydrogen-absorbing alloy for alkaline storage battery is drastically changed and the hydrogen-absorbing capability thereof is lowered as described above.

In the hydrogen-absorbing alloy for alkaline storage battery, in order to attain a further uniformed alloy structure and improve the hydrogen-absorbing capability and the corrosion resistance, it is preferable that the hydrogen-absorbing alloy for alkaline storage battery is subjected to a heat treatment. Particularly, it is preferable that the heat treatment is carried out for 1 to 15 hours at a temperature which is 25° C. to 70° C. lower than a liquefy beginning temperature Tm.

In the alkaline storage battery according to the invention employing a positive electrode, a negative electrode using a hydrogen-absorbing alloy and an alkaline electrolyte, the hydrogen-absorbing alloy for alkaline storage battery described above is utilized for the negative electrode.

The hydrogen-absorbing alloy for alkaline storage battery according to the present invention is the hydrogen-absorbing alloy for alkaline storage battery having the component represented by the general formula $Ln_{1-x}Mg_xNi_{a-b-c}Al_b\Sigma_c$, where Ln is at least an element selected from rare earth elements including Y, Zr, and Z is at least one element selected from the group consisting of V, Nb, Ta, Cr, Mo, Mn, Fe, Co, Ga, Zn, Sn, In, Cu, Si, P, and B, $0.05 \leq x < 0.25$, $2.8 \leq a \leq 3.9$, $0 < b \leq 0.30$, and $0 \leq c \leq 0.25$ produced by the rapid cool using the rapid quenching method. Therefore, it is possible to attain the hydrogen-absorbing alloy for alkaline storage battery having the $Ce_2Ni_7$ crystal structure or the similar structure which has the high crystallinity with the uniform structure.

As a result, in the hydrogen-absorbing alloy for alkaline storage battery according to the present invention, the hydrogen-absorbing capability and the corrosion resistance are improved.

Further, in the present invention, the use of the hydrogen-absorbing alloy for alkaline storage battery for the negative electrode makes it possible to attain the alkaline storage battery having the high capacity and the superior cycle life.

These and other objects, advantages and features of the invention will become apparent from the following description thereof taken in conjunction with the accompanying drawings which illustrate specific embodiment of the invention.

DESCRIPTION OF THE PREFERRED EMBODIMENTS

Figure 1:
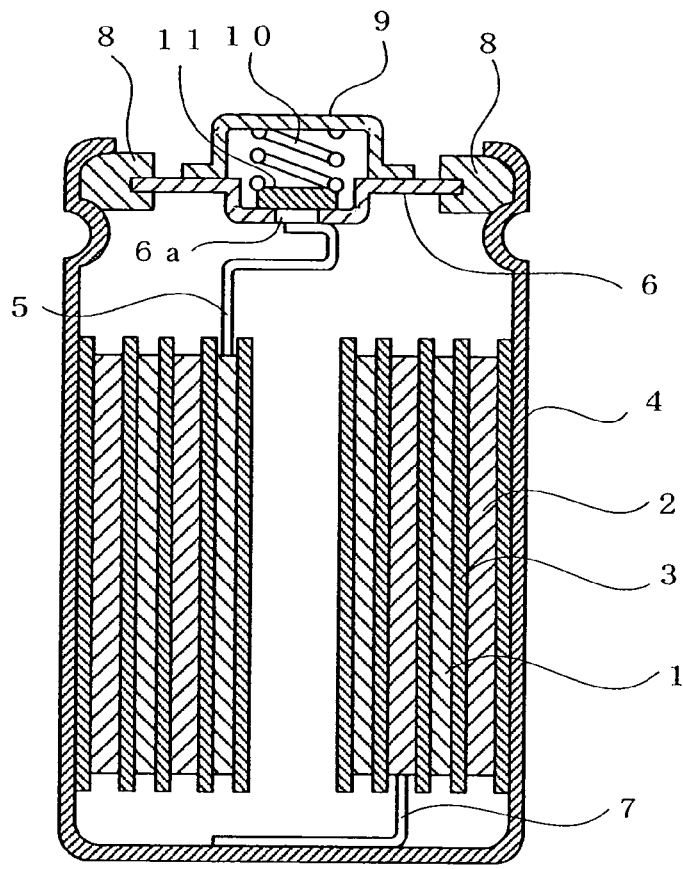
FIG. 1 is a schematic cross-sectional view illustrating an alkaline storage battery, fabricated in Examples and Comparative Examples of the invention.

Hereinbelow, hydrogen-absorbing alloy for alkaline storage battery and alkaline storage batteries using the hydrogen-absorbing alloy for alkaline storage battery according to embodiments of the invention are specifically described, and it will be demonstrated by the comparison with comparative examples that the cycle life is improved in the alkaline storage batteries. It should be construed, however, that the hydrogen-absorbing alloy for alkaline storage battery and the alkaline storage battery according to the invention are not limited to those illustrated in the following embodiments, and various changes and modifications may be made unless such changes and modifications depart from the scope of the invention.

Example 1

In Example 1, a hydrogen-absorbing alloy for alkaline storage battery used for a negative electrode was fabricated as follows. Mg, Ni, and Al as well as rare earth elements La, Pr and Nd were mixed together to produce a predetermined alloy composition, and the mixture was then melted in a high frequency induction melting furnace in argon gas atmosphere and then rapidly cooled by a rapid quenching method using a single roll casting apparatus to prepare a hydrogen-absorbing alloy ingot. The hydrogen-absorbing alloy ingot was subjected to a heat treatment at a temperature 35° C. lower than a liquefy beginning temperature Tm for 12 hours to prepare a hydrogen-absorbing alloy ingot having a composition of $La_{0.18}Pr_{0.34}Nd_{0.34}Mg_{0.13}Ni_{3.17}Al_{0.23}$. The liquefy beginning temperature Tm was determined by using a differential scanning calorimeter (DSC).

Subsequently, the resultant hydrogen-absorbing alloy ingot was mechanically pulverized in an inert atmosphere and classified to obtain a hydrogen-absorbing alloy powder having a volume average particle size of 65 μm.

Next, as a binding agent, 1 part by weight of styrene-butadiene rubber, 0.2 parts-by-weight of sodium polyacrylic acid and 0.2 parts by weight of carboxymethylcellulose, as a conductive agent, 1 part by weight of nickel metal flake and 1 part by weight of carbon black, and 50 parts by weight of water were mixed with 100 parts by weight of the hydrogen-absorbing alloy powder to prepare a paste. The prepared paste was applied onto both sides of conductive cores made of thick nickel-plated punched metal and then dried. The resultant material was pressed and thereafter cut into predetermined dimensions to prepare a hydrogen-absorbing alloy electrode used for the negative electrode.

Meanwhile, a positive electrode was prepared as follows. Nickel hydroxide powder containing 2.5 weight % of zinc and 1.0 weight % of cobalt was put into an aqueous solution of cobalt sulfate, and 1 mole of aqueous solution of sodium hydroxide was gradually dropped into the mixture with stirring to cause them to react with each other until the pH became 11; thereafter, the resulting precipitate was filtered, washed with water, and vacuum dried. Thus, nickel hydroxide the surface of which was coated with 5 weight % of cobalt hydroxide was obtained. Then, a 25 weight % aqueous solution of sodium hydroxide was added and impregnated to the nickel hydroxide the surface of which was coated with cobalt hydroxide, at a weight ratio of 1:10, and the resultant was annealed at 85° C. for 8 hours with stirring; thereafter, this was washed with water and dried, whereby a positive electrode material was obtained, in which the surface of the nickel hydroxide was coated with sodium-containing cobalt oxide. A valence of cobalt contained in the cobalt oxide was 3.05.

Then, 95 parts by weight of the positive electrode material thus prepared, 3 parts by weight of zinc oxide, and 2 parts by weight of cobalt hydroxide were mixed together, and 50 parts by weight of an aqueous solution of 0.2 weight % hydroxypropylcellulose was added to the mixture and mixed together to prepare a slurry, which was then filled into a nickel foam having a weight per unit area of about 600 g/m$^2$, a porosity of 95%, and a thickness of about 2 mm. The resultant was dried and pressed, and thereafter cut into predetermined dimensions. Thus, the positive electrode composed of a non-sintered nickel electrode was prepared.

A nonwoven fabric made of polypropylene was used as a separator. An alkaline aqueous solution containing KOH, NaOH, and LiOH at a weight ratio of 15:2:1 having a specific gravity of 1.30 was used as an alkaline electrolyte. Using these components, an alkaline storage battery was fabricated, which was cylindrical shape having a design capacity of 1500 mAh as illustrated in FIG. 1.

The alkaline storage battery was fabricated in the following manner. A positive electrode 1 and a negative electrode 2 were spirally coiled with a separator 3 interposed therebetween, as illustrated in FIG. 1, and these were accommodated in a battery can 4. Then, the positive electrode 1 was connected to a positive electrode cap 6 via a positive electrode lead 5, and the negative electrode 2 was connected to the battery can 4 via a negative electrode lead 7. Then, the alkaline electrolyte was poured into the battery can 4. Thereafter, an insulative packing 8 was placed between the battery can 4 and the positive electrode cap 6, and the battery can 4 was sealed. The battery can 4 and the positive electrode cap 6 were electrically insulated by the insulative packing 8. A blockade plate 11 attaching coil spring 10 was placed between the positive electrode cap 6 and a positive electrode external terminal 9 to blockade a gas releasing hole 6a provided on the positive electrode cap 6. The coil spring 10 can be compressed to release gas from the interior of the battery to the atmosphere when the internal pressure of the battery unusually increases.

Example 2

In Example 2, a hydrogen-absorbing alloy for alkaline storage battery having a composition of $La_{0.17}Pr_{0.33}Nd_{0.33}Mg_{0.17}Ni_{3.10}Al_{0.20}$ was prepared in the same manner as Example 1 except that the mixing ratio of rare earth elements La, Pr and Nd, Mg, Ni, and Al was changed from that of the hydrogen-absorbing alloy of Example 1, and an alkaline storage battery of Example 2 using the hydrogen-absorbing alloy for alkaline storage battery was fabricated in the same manner as Example 1.

Example 3

In Example 3, a hydrogen-absorbing alloy for alkaline storage battery having a composition of $La_{0.18}Pr_{0.36}Nd_{0.36}Mg_{0.11}Ni_{3.20}Al_{0.20}$ was prepared in the same manner as Example 1 except that the mixing ratio of rare earth elements La, Pr and Nd, Mg, Ni, and Al was changed from that of the hydrogen-absorbing alloy of Example 1, and an alkaline storage battery of Example 3 using the hydrogen-absorbing alloy for alkaline storage battery was fabricated in the same manner as Example 1.

Example 4

In Example 4, Mg, Ni, Al and Co as well as rare earth elements La, Pr and Nd were mixed together to produce a predetermined alloy composition, and a temperature of heat treatment of a hydrogen-absorbing alloy ingot in argon gas atmosphere was set to be 60° C. lower than the liquefy beginning temperature Tm in the fabrication process of the hydrogen-absorbing alloy for alkaline storage battery of Example 1. Except for the above, the same procedure as Example 1 was used to prepare a hydrogen-absorbing alloy for alkaline storage battery having a composition of $La_{0.35}Pr_{0.225}Nd_{0.225}Mg_{0.20}Ni_{3.20}Al_{0.10}Co_{0.10}$ and to fabricate an alkaline storage battery of Example 4 using the hydrogen-absorbing alloy for alkaline storage battery.

Example 5

In Example 5, Zr, Mg, Ni, and Al as well as rare earth elements La, Pr and Nd were mixed together to produce a predetermined alloy composition. Except for the above, a hydrogen-absorbing alloy for alkaline storage battery having a composition of $La_{0.49}Pr_{0.15}Nd_{0.15}Zr_{0.01}Mg_{0.20}Ni_{3.30}Al_{0.10}$ was prepared and an alkaline storage battery of Example 5 using the hydrogen-absorbing alloy for alkaline storage battery was fabricated in the same manner as Example 1.

Example 6

In Example 6, Mg, Ni, Al and Co as well as rare earth elements La and Nd were mixed together to produce a predetermined alloy composition, and a temperature of heat treatment of a hydrogen-absorbing alloy ingot in argon gas atmosphere was set to be 60° C. lower than the liquefy beginning temperature Tm in the fabrication process of the hydrogen-absorbing-alloy for alkaline storage battery of Example 1. Except for the above, the same procedure as Example 1 was used to prepare a hydrogen-absorbing alloy for alkaline storage battery having a composition of $La_{0.50}Nd_{0.30}Mg_{0.20}Ni_{3.20}Al_{0.10}Cu_{0.10}$ and to fabricate an alkaline storage battery of Example 6 using the hydrogen-absorbing alloy for alkaline storage battery.

Example 7

In Example 7, Mg, Ni, Al and Co as well as rare earth elements La, Pr and Nd were mixed together to produce a predetermined alloy composition, and a temperature of heat treatment of a hydrogen-absorbing alloy ingot in argon gas atmosphere was set to be 60° C. lower than the liquefy beginning temperature Tm in the fabrication process of the hydrogen-absorbing alloy for alkaline storage battery of Example 1. Except for the above, the same procedure as Example 1 was used to prepare a hydrogen-absorbing alloy for alkaline storage battery having a composition of $La_{0.35}Pr_{0.225}Nd_{0.225}Mg_{0.20}Ni_{3.17}Al_{0.13}CO_{0.10}$ and to fabricate an alkaline storage battery of Example 7 using the hydrogen-absorbing alloy for alkaline storage battery.

Comparative Example 1

In Comparative Example 1, Mg, Ni, Al and Co as well as rare earth element La were mixed together to produce a predetermined alloy composition in the fabrication process of the hydrogen-absorbing alloy for alkaline storage battery of Example 1. Except for the above, the same procedure as Example 1 was used to prepare a hydrogen-absorbing alloy for alkaline storage battery having a composition of $La_{0.75}Mg_{0.25}Ni_{3.20}Al_{0.10}Co_{0.10}$ and to fabricate an alkaline storage battery of Comparative Example 1 using the hydrogen-absorbing alloy for alkaline storage battery.

Comparative Example 2

An alkaline storage battery of Comparative Example 2 was fabricated as follows. Mg, Ni and Al as well as rare earth elements La, Pr and Nd were mixed together to produce a predetermined alloy composition in the fabrication process of the hydrogen-absorbing alloy for alkaline storage battery of Example 1, and the mixture was then melted in the high frequency induction melting furnace in argon gas atmosphere. Thereafter, the mixture was poured into a metal mold and cooled naturally without being cooled rapidly by the rapid quenching method. Thus, a hydrogen-absorbing alloy for alkaline storage battery having the same composition of Example 1 $La_{0.18}Pr_{0.34}Nd_{0.34}Mg_{0.13}Ni_{3.17}Al_{0.23}$ was prepared and an alkaline storage battery of Comparative Example 2 using the hydrogen-absorbing alloy for alkaline storage battery was fabricated in the same manner as Example 1.

Comparative Example 3

An alkaline storage battery of Comparative Example 3 was fabricated as follows. The mixing ratio of rare earth elements La, Pr and Nd, Mg, Ni, and Al was changed from that of the hydrogen-absorbing alloy of Example 1, and the mixture was melted in the high frequency induction melting furnace in argon gas atmosphere. Thereafter, the mixture was poured into the metal mold and cooled naturally without being cooled rapidly by the rapid quenching method, as the same as Comparative Example 2. Thus, a hydrogen-absorbing alloy for alkaline storage battery having the same composition of Example 2, $La_{0.17}Pr_{0.33}Nd_{0.33}Mg_{0.17}Ni_{3.10}Al_{0.20}$ was prepared and an alkaline storage battery of Comparative Example 3 using the hydrogen-absorbing-alloy for alkaline storage battery was fabricated in the same manner as Example 1.

Comparative Example 4

An alkaline storage battery of Comparative Example 4 was fabricated as follows. Mg, Ni, Al and Co as well as rare earth element La were mixed together to produce a predetermined alloy composition in the fabrication process of the hydrogen-absorbing alloy for alkaline storage battery of Example 1, and the mixture was then melted in the high frequency induction melting furnace in argon gas atmosphere. Thereafter, the mixture was poured into the metal mold and cooled naturally without being cooled rapidly by the rapid quenching method, as the same as Comparative Example 2. Thus, a hydrogen-absorbing alloy for alkaline storage battery having the same composition of Comparative Example 1, $La_{0.75}Mg_{0.25}Ni_{3.20}Al_{0.10}Co_{0.10}$ was prepared and an alkaline storage battery of Comparative Example 4 using the hydrogen-absorbing alloy for alkaline storage battery was fabricated in the same manner as Example 1.

Comparative Example 5

An alkaline storage battery of Comparative Example 5 was fabricated as follows. Mg, Ni, Al and Co as well as rare earth elements La, Pr and Nd were mixed together to produce a predetermined alloy composition in the fabrication process of the hydrogen-absorbing alloy for alkaline storage battery of Example 1, and the mixture was then melted in the high frequency induction melting furnace in argon gas atmosphere. Thereafter, the mixture was poured into the metal mold and cooled naturally without being cooled rapidly by the rapid quenching method. The temperature of heat treatment of a hydrogen-absorbing alloy ingot in argon gas atmosphere was set to be 60° C. lower than the liquefy beginning temperature Tm. Thus, a hydrogen-absorbing alloy for alkaline storage battery having the same composition of Example 4, $La_{0.35}Pr_{0.225}Nd_{0.225}Mg_{0.20}Ni_{3.20}Al_{0.10}Cu_{0.10}$ was prepared and an alkaline storage battery of Comparative Example 5 using the hydrogen-absorbing alloy for alkaline storage battery was fabricated in the same manner as Example 1.

Comparative Example 6

An alkaline storage battery of Comparative Example 6 was fabricated as follows. Zr, Mg, Ni, Al and Co as well as rare earth elements La, Pr and Nd were mixed together to produce a predetermined alloy composition in the fabrication process of the hydrogen-absorbing alloy for alkaline storage battery of Example 1, and the mixture was then melted in the high frequency induction melting furnace in argon gas atmosphere. Thereafter, the mixture was poured into the metal mold and cooled naturally without being cooled rapidly by the rapid quenching method. The temperature of heat treatment of a hydrogen-absorbing alloy ingot in argon gas atmosphere was set to be 50° C. lower than the liquefy beginning temperature Tm. Thus, a hydrogen-absorbing alloy for alkaline storage battery having the same composition of Example 5, $La_{0.49}Pr_{0.15}Nd_{0.15}Zr_{0.01}Mg_{0.20}Ni_{3.30}Al_{0.10}$ was prepared and an alkaline storage battery of Comparative Example 6 using the hydrogen-absorbing alloy for alkaline storage battery was fabricated in the same manner as Example 1.

Comparative Example 7

An alkaline storage battery of Comparative Example 7 was fabricated as follows. Mg, Ni, Al and Co as well as rare earth elements La and Nd were mixed together to produce a predetermined alloy composition in the fabrication process of the hydrogen-absorbing alloy for alkaline storage battery of Example 1, and the mixture was then melted in the high frequency induction melting furnace in argon gas atmosphere. Thereafter, the mixture was poured into the metal mold and cooled naturally without being cooled rapidly by the rapid quenching method. The temperature of heat treatment of a hydrogen-absorbing alloy ingot in argon gas atmosphere was set to be 50° C. lower than the liquefy beginning temperature Tm. Thus, a hydrogen-absorbing alloy for alkaline storage battery having the same composition of Example 6, $La_{0.50}Nd_{0.30}Mg_{0.20}Ni_{3.20}Al_{0.10}Cu_{0.10}$ was prepared and an alkaline storage battery of Comparative Example 7 using the hydrogen-absorbing alloy for alkaline storage battery was fabricated in the same manner as Example 1.

Comparative Example 8

An alkaline storage battery of Comparative Example 8 was fabricated as follows. Mg, Ni, Al and Co as well as rare earth elements La, Pr and Nd were mixed together to produce a predetermined alloy composition in the fabrication process of the hydrogen-absorbing alloy for alkaline storage battery of Example 1, and the mixture was then melted in the high frequency induction melting furnace in argon gas atmosphere. Thereafter, the mixture was poured into the metal mold and cooled naturally without being cooled rapidly by the rapid quenching method. The temperature of heat treatment of a hydrogen-absorbing alloy ingot in argon gas atmosphere was set to be 50° C. lower than the liquefy beginning temperature Tm. Thus, a hydrogen-absorbing alloy for alkaline storage battery having the same composition of Example 7, $La_{0.35}Pr_{0.225}Nd_{0.225}Mg_{0.20}Ni_{3.17}Al_{0.13}CO_{0.10}$ was prepared and an alkaline storage battery of Comparative Example 8 using the hydrogen-absorbing alloy for alkaline storage battery was fabricated in the same manner as Example 1.

Next, each of the alkaline storage batteries of Examples 1 to 7 and Comparative Examples 1 to 8 was left as it is at a temperature 45° C. for 12 hours and charged at a current of 150 mA for 16 hours at a temperature of 25° C. and then left as it is for 1 hour. Thereafter, each of the alkaline storage batteries of Examples 1 to 7 and Comparative Examples 1 to 8 was discharged at a current of 300 mA until a battery voltage became 1.0 V and left as it is for 1 hour. This charging and discharging process was repeated three times to activate the alkaline storage batteries of Examples 1 to 7 and Comparative Examples 1 to 8.

Then, each of the alkaline storage batteries of Examples 1 to 7 and Comparative Examples 1 to 8 that was activated in the above-described manner was charged at a current of 1500 mA. After the battery voltage reached the maximum value, each battery was further charged until the voltage lowered 10 mV and paused for 20 minutes. Then, each of the alkaline storage batteries of Examples 1 to 7 and Comparative Examples 1 to 8 was discharged at a current of 1500 mA until the battery voltage reached 1.0 V and paused for 10 minutes. This charge-discharge cycle was repeated to obtain the number of cycles for each battery until the discharge capacity of each battery lowered to 70% of the discharge capacity at the first cycle. Then, the cycle life of each of the alkaline storage batteries was determined using relative indices wherein the cycle number of the alkaline storage battery of Comparative Example 2 was taken as 100. The results are shown in Table 1 below.

exhibited a remarkable improvement in cycle life over the alkaline storage batteries of Comparative Examples 1 and 4 using the hydrogen-absorbing alloy for alkaline storage battery wherein the Mg composition ratio x is 0.25, and the alkaline storage batteries of Comparative Examples 2, 3 and 5 to 8 using the hydrogen-absorbing alloy for alkaline storage battery wherein the Mg composition ratio x satisfies the relation of $0.05 \leq x < 0.25$, produced by natural cool using the metal mold, not the rapid cool using the rapid quenching method.

In addition, using each hydrogen-absorbing alloy for alkaline storage battery fabricated in Example 4 and Comparative Examples 1 and 5, 75 parts by weight of nickel powder was added to 25 parts by weight of hydrogen-absorbing alloy powder and it was pressed and shaped into a pellet form. Thus, each of the negative electrodes using the hydrogen-absorbing alloy for alkaline storage battery was fabricated.

Figure 2:
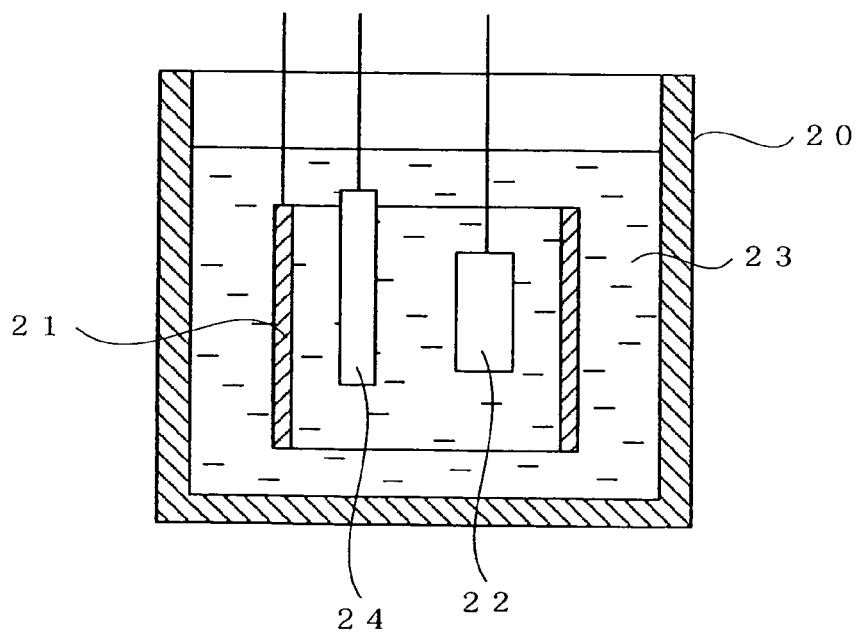
FIG. 2 is a schematic cross-sectional view illustrating a test cell using a hydrogen-absorbing alloy for alkaline storage battery for its negative electrode fabricated in Example 4 and Comparative Examples 1 and 5 of the invention.

Meanwhile, a sintered nickel electrode of cylindrical form was used as each of the positive electrodes, and 30 weight % of potassium hydroxide aqueous solution was used as each of the alkaline electrolytes. Thus, a test cell illustrated in FIG. 2 was fabricated.

In the test cell, an alkaline electrolyte 23 was poured into a vessel 20 which is made of polypropylene, and a negative electrode 22 and a reference electrode 24 of mercuric oxide electrode were accommodated in a positive electrode 21 of cylindrical form, and the positive electrode 21, the negative electrode 22 and the reference electrode 24 were soaked in the alkaline electrolyte 23.

The resultant test cell using the negative electrode 22 was charged at a current of 180 mA per 1 g of the hydrogen-absorbing alloy for 170 minutes, and discharged at the current of 180 mA per 1 g of the hydrogen-absorbing alloy until a potential of the negative electrode 22 versus the reference electrode 24 reached −0.7 V. This charge-discharge cycle was repeated five times to obtain a maximum capacity of the negative electrode. Then, in each negative electrode using the hydrogen-absorbing alloy for alkaline storage battery of Example 4 and Comparative Examples 1 and 5, each maxi-

TABLE 1

| | Hydrogen-absorbing alloy composition | cooling method | Heat treatment temperature (° C.) | cycle life |
|---|---|---|---|---|
| Example 1 | $La_{0.18}Pr_{0.34}Nd_{0.34}Mg_{0.13}Ni_{3.17}Al_{0.23}$ | rapid quenching | Tm-35 | 110 |
| Example 2 | $La_{0.17}Pr_{0.33}Nd_{0.33}Mg_{0.17}Ni_{3.10}Al_{0.20}$ | rapid quenching | Tm-35 | 107 |
| Example 3 | $La_{0.18}Pr_{0.36}Nd_{0.36}Mg_{0.11}Ni_{3.20}Al_{0.20}$ | rapid quenching | Tm-35 | 108 |
| Example 4 | $La_{0.35}Pr_{0.225}Nd_{0.225}Mg_{0.20}Ni_{3.20}Al_{0.10}Co_{0.10}$ | rapid quenching | Tm-60 | 104 |
| Example 5 | $La_{0.49}Pr_{0.15}Nd_{0.15}Zr_{0.01}Mg_{0.20}Ni_{3.30}Al_{0.10}$ | rapid quenching | Tm-35 | 104 |
| Example 6 | $La_{0.50}Nd_{0.30}Mg_{0.20}Ni_{3.20}Al_{0.10}Co_{0.10}$ | rapid quenching | Tm-60 | 102 |
| Example 7 | $La_{0.35}Pr_{0.225}Nd_{0.225}Mg_{0.20}Ni_{3.17}Al_{0.13}Co_{0.10}$ | rapid quenching | Tm-60 | 108 |
| Comparative Example 1 | $La_{0.75}Mg_{0.25}Ni_{3.20}Al_{0.10}Co_{0.10}$ | rapid quenching | Tm-35 | 87 |
| Comparative Example 2 | $La_{0.18}Pr_{0.34}Nd_{0.34}Mg_{0.13}Ni_{3.17}Al_{0.23}$ | metal mold cooling | Tm-35 | 100 |
| Comparative Example 3 | $La_{0.17}Pr_{0.33}Nd_{0.33}Mg_{0.17}Ni_{3.10}Al_{0.20}$ | metal mold cooling metal mold cooling | Tm-35 | 100 |
| Comparative Example 4 | $La_{0.75}Mg_{0.25}Ni_{3.20}Al_{0.10}Co_{0.10}$ | metal mold cooling metal mold cooling | Tm-35 | 87 |
| Comparative Example 5 | $La_{0.35}Pr_{0.225}Nd_{0.225}Mg_{0.20}Ni_{3.20}Al_{0.10}Co_{0.10}$ | metal mold cooling metal mold cooling | Tm-60 | 91 |
| Comparative Example 6 | $La_{0.49}Pr_{0.15}Nd_{0.15}Zr_{0.01}Mg_{0.20}Ni_{3.30}Al_{0.10}$ | metal mold cooling metal mold cooling | Tm-50 | 98 |
| Comparative Example 7 | $La_{0.50}Nd_{0.30}Mg_{0.20}Ni_{3.20}Al_{0.10}Co_{0.10}$ | metal mold cooling metal mold cooling | Tm-50 | 96 |
| Comparative Example 8 | $La_{0.35}Pr_{0.225}Nd_{0.225}Mg_{0.20}Ni_{3.17}Al_{0.13}Co_{0.10}$ | metal mold cooling metal mold cooling | Tm-50 | 91 |

The results demonstrate that the alkaline storage batteries of Examples 1 to 7 using the hydrogen-absorbing alloy for alkaline storage battery whose component is represented by a general formula $Ln_{1-x}Mg_xNi_{a-b-c}Al_bZ_c$ where x indicates Mg composition ratio satisfying the relation of $0.05 \leq x < 0.25$ produced by the rapid cool using the rapid quenching method mum capacity was determined. The each maximum capacity was calculated using relative indices wherein the maximum capacity of the negative electrode using the hydrogen-absorbing alloy for alkaline storage battery of Comparative Example 1 was taken as 100, and was indicated as an electrochemical capacity. The results are shown in Table 2 below.

TABLE 2

|  | Hydrogen-absorbing alloy composition | cooling method | Heat treatment temperature (° C.) | electrochemical capacity of hydrogen-absorbing alloy |
|---|---|---|---|---|
| Ex. 4 | $La_{0.35}Pr_{0.225}Nd_{0.225}Mg_{0.20}Ni_{3.20}Al_{0.10}Co_{0.10}$ | rapid quenching | Tm-60 | 104 |
| Comp. Ex. 1 | $La_{0.75}Mg_{0.25}Ni_{3.20}Al_{0.10}Co_{0.10}$ | rapid quenching | Tm-35 | 100 |
| Comp. Ex. 5 | $La_{0.35}Pr_{0.225}Nd_{0.225}Mg_{0.20}Ni_{3.20}Al_{0.10}Co_{0.10}$ | metal mold cooling | Tm-60 | 100 |

The results demonstrate that the hydrogen-absorbing alloy for alkaline storage battery of Example 4 whose component is represented by the general formula $Ln_{1-x}Mg_xNi_{a-b-c}Al_bZ_c$ where x indicates Mg composition ratio satisfying the relation of $0.05 \leq x < 0.25$ produced by the rapid cool using the rapid quenching method, exhibited more increased electrochemical capacity as compared with the hydrogen-absorbing alloy for alkaline storage battery of Comparative Example 1 where the Mg composition ratio x is 0.25, and the hydrogen-absorbing alloy for alkaline storage battery of Comparative Example 5 where the Mg composition ratio x satisfies the relation of $0.05 \leq x < 0.25$ produced by the natural cool using the metal mold, not the rapid cool using the rapid quenching method.

The results shown in Tables 1 and 2 suggest that, even among the hydrogen-absorbing alloys for alkaline storage battery having the same alloy compositions, the hydrogen-absorbing alloy for alkaline storage-battery of Example 4 produced by the rapid quenching method has a superior corrosion resistance and a higher capacity than the hydrogen-absorbing alloy for alkaline storage battery of Comparative Example 5.

Although the present invention has been fully described by way of examples, it is to be noted that various changes and modification will be apparent to those skilled in the art. Therefore, unless otherwise such changes and modifications depart from the scope of the present invention, they should be construed as being included therein.

What is claimed is:

1. A method of making hydrogen-absorbing alloy for alkaline storage battery, comprising:
   preparing a melt of an alloy composition represented by a general formula $Ln_{1-x}Mg_xNi_{a-b-c}Al_bCo_c$, where Ln is at least an element selected from rare earth elements including Y and Zr, $0.05 \leq x \leq 0.20$, $2.8 \leq a \leq 3.9$, $0.1 < b \leq 0.30$, and $0 \leq c \leq 0.25$, wherein (x+b), a total amount of x and b in the general formula, is not less than 0.30;
   cooling the melt at a cooling rate in a range from $10^3$ K/s to $10^6$ K/s, thereby obtaining a solidified alloy composition;
   obtaining a liquefy beginning temperature Tm of the alloy composition; and then
   heat treating the solidified alloy composition for 1 to 15 hours at a temperature which is 25° C. to 70° C. lower than the liquefy beginning temperature Tm,
   wherein the hydrogen-absorbing alloy has a $Ce_2Ni_7$ crystalline structure.

* * * * *